United States Patent [19]

Hsu

[11] Patent Number: 5,579,679
[45] Date of Patent: Dec. 3, 1996

[54] ROASTER

[75] Inventor: Tony Hsu, Tainan Hsien, Taiwan

[73] Assignee: Lundar Electric Industrial Co., Ltd., Tainan Hsien, Taiwan

[21] Appl. No.: 575,769

[22] Filed: Dec. 20, 1995

[51] Int. Cl.$^6$ ........................................ A47J 37/00
[52] U.S. Cl. ........................ 99/339; 99/340; 99/422; 99/448; 99/483; 219/214; 219/400
[58] Field of Search ................. 99/337, 357, 338–340, 99/422–425, 446–450, 483, 484; 219/400, 214; 426/523

[56] References Cited

U.S. PATENT DOCUMENTS

| | | | |
|---|---|---|---|
| 3,580,164 | 5/1971 | Baker | 99/339 |
| 3,604,338 | 9/1971 | Fiedler | 99/339 |
| 3,611,913 | 10/1971 | McGinley | 99/423 |
| 3,965,808 | 6/1976 | Chomette | 99/483 X |
| 3,987,718 | 10/1976 | Lang-Ree et al. | 99/339 X |
| 4,189,631 | 2/1980 | Baker et al. | 99/339 |
| 4,254,697 | 3/1981 | Lang-Ree et al. | 99/401 X |
| 4,421,015 | 12/1983 | Masters et al. | 99/339 X |
| 4,572,061 | 2/1986 | Masters et al. | 219/400 X |
| 4,739,154 | 4/1988 | Bharara et al. | 219/400 X |
| 4,784,054 | 11/1988 | Karos et al. | 99/483 |
| 5,055,312 | 10/1991 | Hildebrand | 99/451 |
| 5,309,824 | 5/1994 | Dromgoole et al. | 99/357 X |

*Primary Examiner*—Timothy F. Simone
*Attorney, Agent, or Firm*—Morton J. Rosenberg; David I. Klein

[57] ABSTRACT

A roaster includes a seating shoe, a chassis, an electrical heater, a sidboard, a fascia, a tie strap and a frying tray, wherein the chassis is fixed on the seating shoe, and the chassis has three slots along the periphery. The electrical heater has a vertical segment with a plug-in member and a circular segment bent in level state on the top portion. The sideboard, shaped like a wave board, has a plurality of plug-in strips formed along the bottom edge and a plurality of angled straps extending along the top edge thereof. Each angle strap of said sideboard has an aperture at center portion. The fascia includes a plurality of high-rised ribs, low-rised ribs, holes, a longitudinal hole and a slot thereon. The tie strap includes two side straps at respect ends adapted to be inserted into the slots of the chassis and the fascia, respectively, to secure thereto. Whereas, the vertical segment of the electrical heater is inserted through the longitudinal hole, the plug socket and is secured at the chassis that enables the circular segment to laid on the top surface of the fascia, and the frying tray is resting on top of the fascia. This roaster enables to fry a ground beef and to warm a bread at the same time.

2 Claims, 5 Drawing Sheets

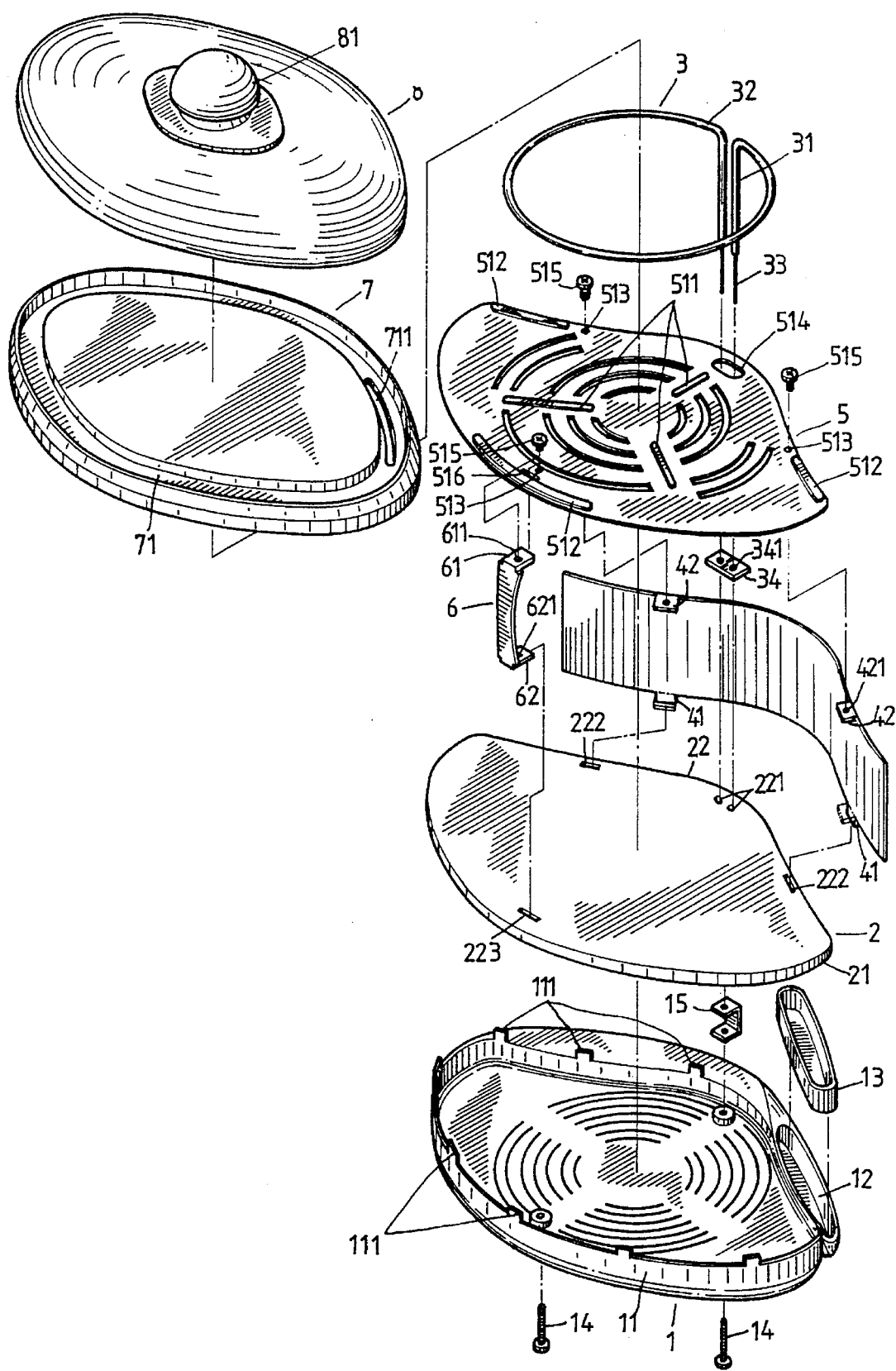
F I G. 1

ROASTER

BACKGROUND OF THE INVENTION

1. Field of the Invention

The present invention relates to a roaster, and more particularly to a roaster which enables to fry a ground beef and to cure a bread at the same time, therefore it is useful both to a family and small business.

2. Description of the Related Art

The hamburger have becoming a very popular food or snack for many years, but in the hamburger monopoly shops, the hamburger processing is deviced into two procedures, one is to fry the ground beef on a digester and the other is to cure the bread in an oven. In this manner, the heated ground beef may be put in between two cured and soft breads to provide a tasty hamburger. However, such process requires a large working space, many workers and certain special equipment which is applicable only to a big monopoly. If it is in an ordinary family, the making of hamburger, according to the above-mentioned procedures, may cause either a mess or a burning food. In this case, the hamburger may not be as tasty as it should be.

According to the traditional equipment of a hamburger maker, most of the hamburger monopolies are equipped with at least a digester and an oven with the temperature and time presetted. This is how the hamburger get its nick name "fast food." However, a fry pan is generally adapted by a family to fry the ground beef and eggs, and an oven is adapted to cure a bread. Therefore, the operator has to pay attention on both sectors, in particular to the oven which is generally designed for a heavy fire, therefore it takes extra attention from the user to it. Hence, it becomes a burden to a cooker in making a hamburger. Any careless will cause the bread or the steak burned.

The inventor, with many years' experiences in the field of electronics and a numerous of tasting various hamburgers prepared in many different methods, has make made the following evaluation and analyzing that:

1. a ground beef requires a higher cooking temperature to fry; and
2. a bread requires a mild cooking temperature for a longer period of time to prepare. Thus, a roaster of the present invention is devised.

SUMMARY OF THE INVENTION

The present invention provides a roaster which can prepare a hamburger in the same time. The feature of the present invention is to provide a machine which includes two processing areas, one area of which includes a frying tray with a cover and a fascia connected to a base assembly by a sideboard and a tie strap to construct another processing area. The said base assembly is consisted of a seating shoe and a chassis. An L-shaped electrical heater is consisted of a circular segment and a vertical segment. The circular segment rests on the top surface of the fascia in level state, and the frying tray seats on the fascia.

BRIEF DESCRIPTION OF THE DRAWINGS

FIG. 1 is an exploded view of the present invention;

DESCRIPTION OF THE PREFERRED EMBODIMENT

Figure 2:
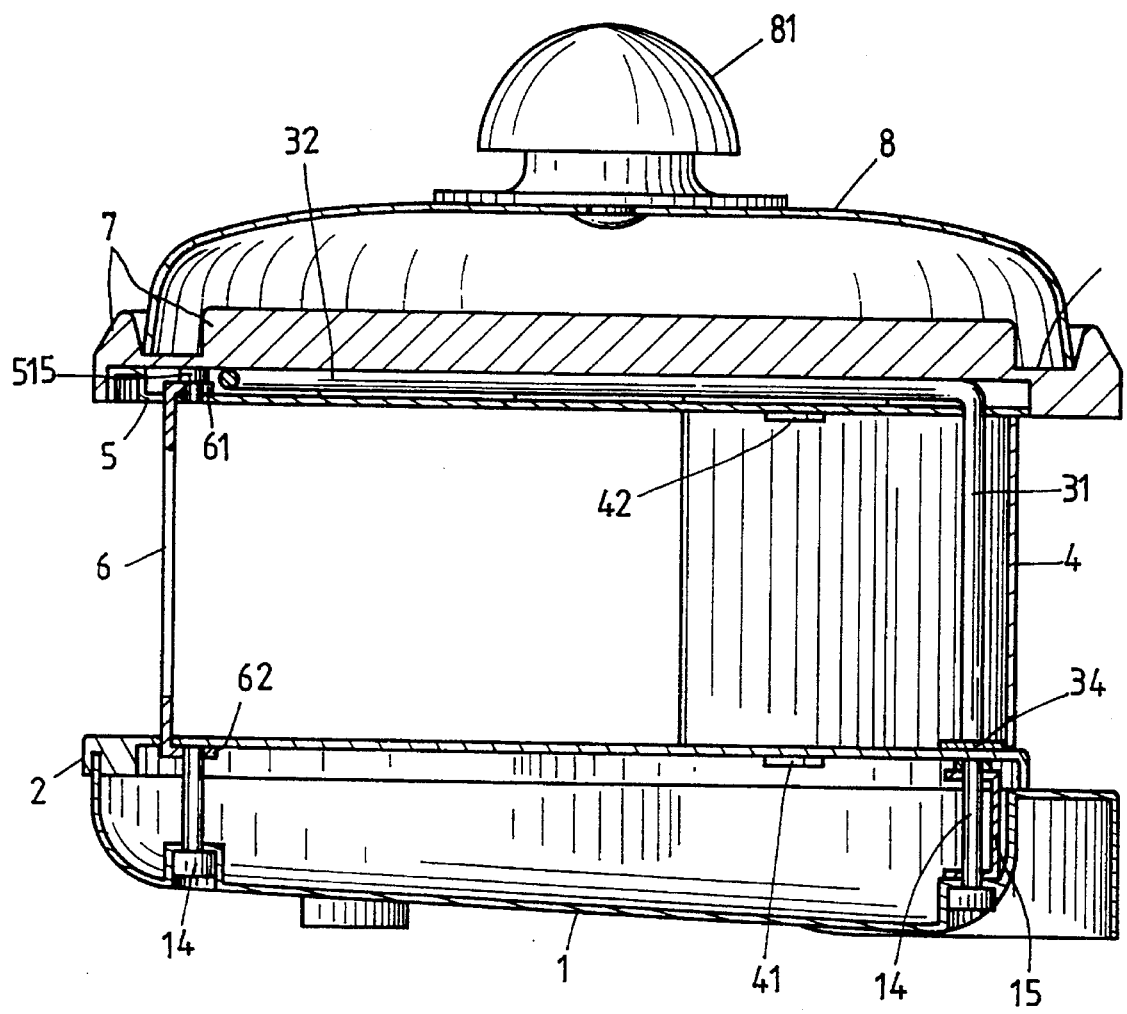
FIG. 2 is a cross-section view of the present invention.

Referring to FIG. 1 and FIG. 2, the present invention includes a seating shoe 1, a chassis 2, an L-shaped electrical bar 3, a sideboard 4, a fascia 5, a tie strap 6, a frying tray 7 and a cover 8. The top side of the seating shoe 1 connects with the chassis 2, and the chassis 2 is connected to the fascia 5 by the sideboard 4 and the tie strap 6. The elextrical heater 3 is fastened to the chassis 2 through the fascia 5. A circular segment 32 of the electrical heater 3 is seating on the surface of the fascia 5 and the frying tray 7 is resting on the circular segment 32 with the cover 8 resting on top of the frying tray 7.

The seating shoe 1 is shaped like a pan having a plural lugs 111 extending upwardly along the skirt 11 and a holder 12 at one outer side of the skirt 11 adapted to accommodate a container 13 therein. A plural bolts and a connector 15 are employed to secure the seating shoe 1 to the chassis 2.

The chassis 2 is shaped like a pan in its upside-down status, corresponding to the outline of the seating shoe 1, having a skirt 21 extending downwardly along the periphery of the surface which defines as a plane 22. Three slots 222 and 223, and two holes 221 are formed on the inner portion of the plane 22. The skirt 21 is sized slightly larger than that of the skirt 11 of the seating shoe 1.

The electrical bar 3 having an inverted L-shaped contour comprises a vertical segment 31 having two parallel bars 1 bars and a circular segment 32 in level state on the top end portion. Two plug-in members 33 are formed at the distal ends of the vertical segment 31, respectively, for inserting through the holes 341 of a plug socket 34.

The sideboard 4 having a wave shaped contour, comprises two plug-in strips 41 extending downwardly along the bottom edge thereof for inserting into corresponding slotted holes 222 on the chassis 2, and two angled strips 42 extending along the top edge portion thereof. Each angled strip 42 has an aperture 421 at a center portion thereof.

The fascia 5 has a plane 51 corresponding to the outline of the chassis 2 having a plurality of low-rised ribs 511 extending upwardly therefrom adapted for the circular segment 32 to seat thereon, a plurality of high-rised ribs 512 extending upwardly therefrom along the edge of the fascia 5 and spaced from each other, a plurality of holes 513 corresponding to the apertures 421 of the angled strap 42 adapted to secure the fascia 5, the chassis 2 and the seating shoe 1 together. A longitudinal hole 514 is formed on the fascia 5 adapted for the insertion of the plug-in members 33 of the vertical segment 31 of the electrical heater 3 therethrough. A slot 516 is formed on the surface thereof.

The tie strap 6 is a U-shaped member having two side strap 61 & 62 with two apertures 611 & 612 formed at the center portions thereof. The side straps 61 and 62 are adapted to be inserted into the slot 223 of the chassis 2 and the slot 516 of the fascia 5, respectively and fastened thereat.

The frying tray 7 is shaped like an upside-down pan having its outline corresponding to that of the fascia 5 and the chassis 2. An oil trap 71 is formed on the periphery having a drainage 711 therein and is aligned to the holder 12 and the container 13 of the seating shoe 1.

The cover 8 has a grip 81 on the center top portion for handling convenience.

Figure 3:
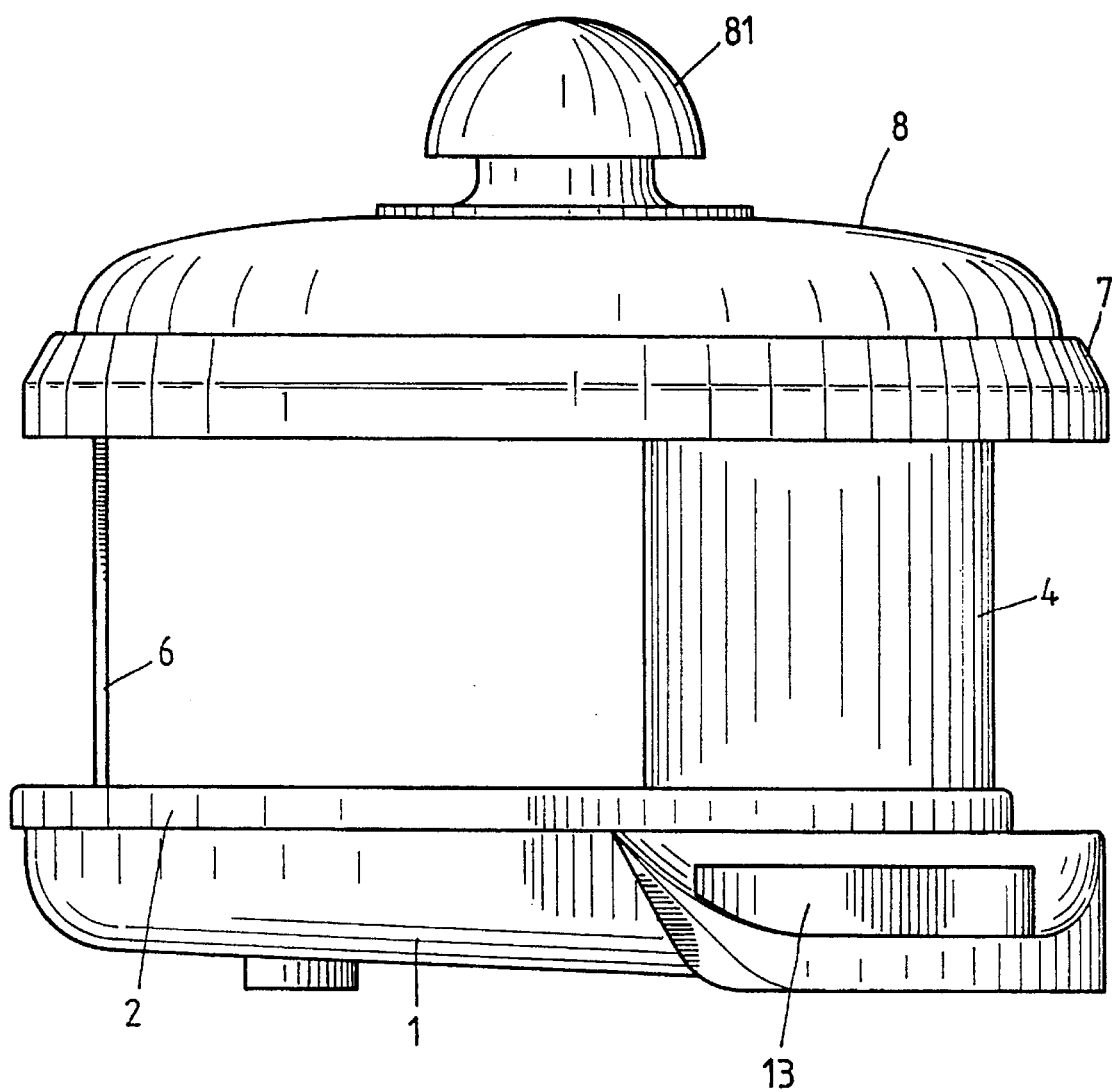
FIG. 3 is a side view of the present invention.
Figure 4:
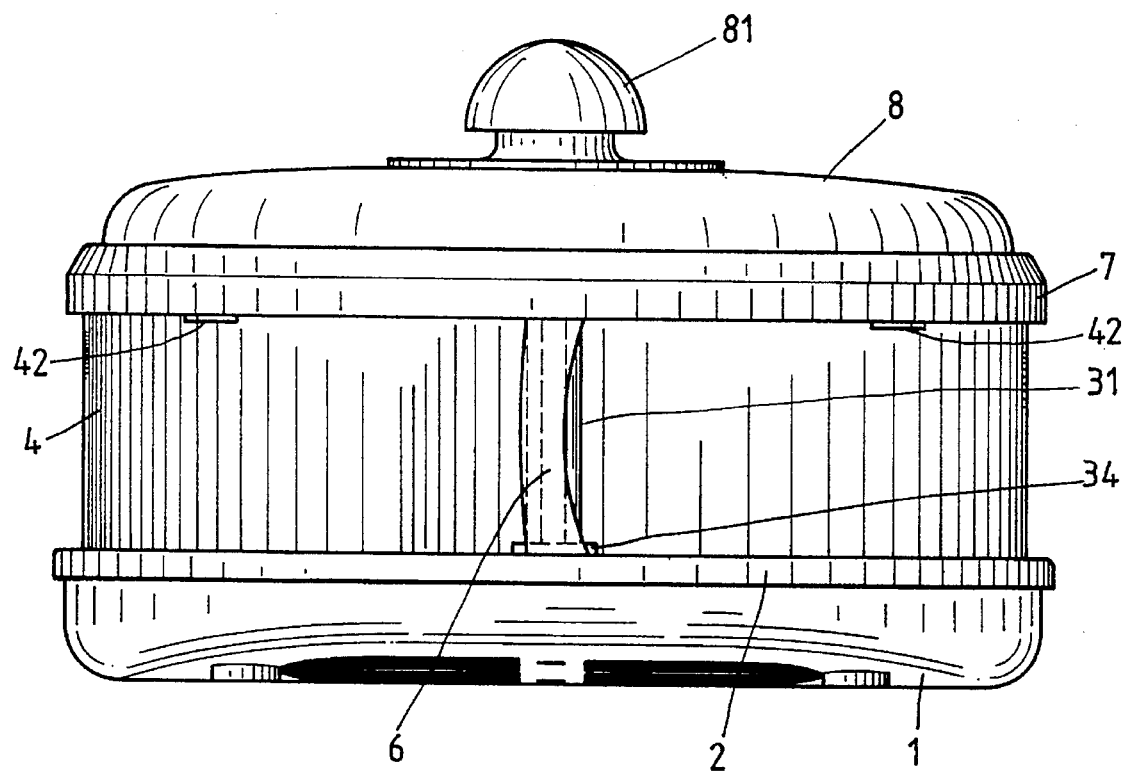
FIG. 4 is a front view of the present invention.

In assembling, referring to FIG. 2 to FIG. 4, first placing the chassis 2 onto the seating shoe 1 with the skirt 21 overhanging the seating shoe 1; inserting the plug-in strips 41 of the sideboard 4 into the corresponding slotted hole 222 on said plane 22 of the chassis 2, and bent from the other side for fastening; inserting the fasteners 515 through the holes 513 of the plane 52, the holes 421 of the angled strap 42 and the aperture 611 of the upper side strap 61 to secure the fascia 5 to the sideboard 4; then, inserting the bolt 14 through a hole of the seating shoe 1 to secure the tie strap 6 to the seating shoe 1; again, inserting the vertical segment 31 through the hole 514 with the plug-in members 33 passing through the apertures 341 of the plug socket 34 and the holes 221 of the chassis 2 to secure the vertical segment 31 thereat by means of inserting a bolt 14 through a hole of the seating shoe 1 and the connector 15. Whereas, the circular segment 32 is seating on the top surface of the fascia 5 after assembling, and the frying tray 7 is resting on top of the fascia 5 and the circular segment 32 with the drainage 711 of the oil trap 71 aligned to the holder 12 and the container 13. The power supply and the control system of the present invention is an ordinary skill and therefore, will not be described the details here.

Figure 5:
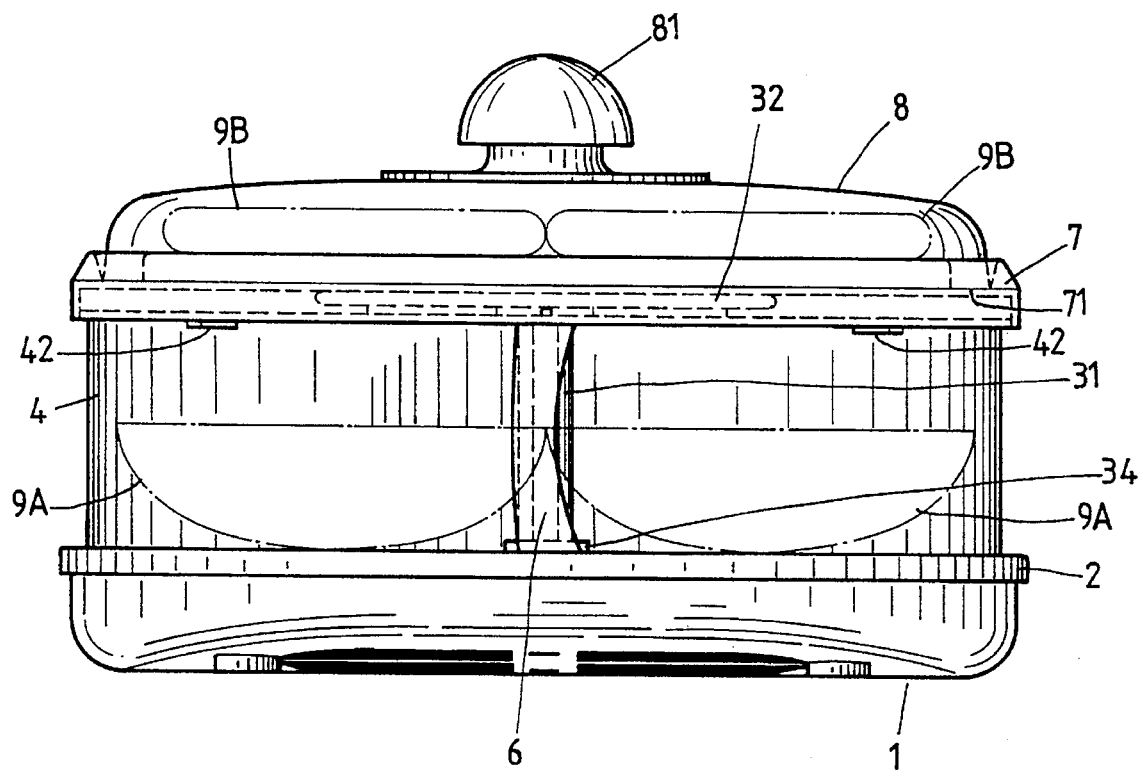
FIG. 5 is a side view showing an operation of the present invention.

In operating, referring to FIG. 5, the bread 9A is laid on the plane 22 of said chassis 2 in the opening space on the said of said sideboard 4, and the ground beef 9B on said frying tray 7 with the cover 8 placed on top of it; meanwhile upon the power is on, the electrical heater 3 will transform heat to the frying tray 7 directly for providing a higher temperature to fry the beef 9B and a indirect heat, a lower temperature will be radiated to the bread 9A. Hence, a hamburger can be prepared at the same time which saves both time and energy.

I claim:

1. A roaster comprising a seating shoe, a chassis, an electrical heater, a sideboard, a fascia, a tie strap and a frying tray, and the improvement comprising:

said seating shoe having lugs extending upwardly along the skirt and a holder at one outer side thereof adapted to receive a container therein;

said chassis having a skirt extending downwardly along the periphery thereof, at least two slots and a pair of through holes formed along the periphery thereof;

said electrical heater having a vertical segment with a plug-in member and a circular segment bent in level state on the top portion;

said sideboard being a wave board having plug-in strips formed along the bottom edge and said angled straps along the top portion thereof, said plug-in strips being adapted to be inserted into said slots from one end of said chassis and bent from the other end for securing purpose, each said angled strap of said sideboard having a hole at the center portion;

said fascia having high-rised ribs, low-rised ribs, a slot, a longitudinal hole and apertures formed on the surface thereof, wherein said apertures of said fascia are adapted for insertion of said angled straps of said sideboard to secure said sideboard to said fascia, and said longitudinal hole of said fascia is adapted for the insertion of said vertical segment of said electrical heater therethrough;

said tie strap having two side straps at respect ends being adapted to be inserted into said slots of said chassis and of said fascia for connection purpose, whereas said vertical segment is secured to said chassis with said circular segment resting on top surface of said fascia, said frying tray seating on top of said fascia and said circular segment.

2. A roaster, as recited in claim 1, wherein a holder formed on one outer side of said seating shoe is adapted to receive a container, and an oil trap is formed along the periphery of said frying tray having a drainage thereon.

\* \* \* \* \*